US012613768B2

(12) United States Patent
Almajan et al.

(10) Patent No.: US 12,613,768 B2
(45) Date of Patent: Apr. 28, 2026

(54) SYSTEM AND METHOD OF CHECKING INTEGRITY OF AN INSTRUCTION DECODER OF A PROCESSING SYSTEM

(71) Applicant: NXP USA, Inc., Austin, TX (US)

(72) Inventors: Iani Bogdan Almajan, Bragadiru (RO); Joseph Charles Circello, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 243 days.

(21) Appl. No.: 18/599,289

(22) Filed: Mar. 8, 2024

(65) Prior Publication Data

US 2025/0217230 A1    Jul. 3, 2025

(30) Foreign Application Priority Data

Dec. 27, 2023    (RO) ............................... A 202300878

(51) Int. Cl.
*G06F 11/10*        (2006.01)
*G06F 9/30*         (2018.01)

(52) U.S. Cl.
CPC ...... *G06F 11/1004* (2013.01); *G06F 9/30156* (2013.01)

(58) Field of Classification Search
CPC ............. G06F 9/30156; G06F 11/1004; G06F 11/1048
See application file for complete search history.

(56) References Cited

U.S. PATENT DOCUMENTS 4,785,452 A  *  11/1988  Petz .................... G06F 11/1012
                                                          714/E11.042
5,384,788 A      1/1995  Parks et al.
                      (Continued)

FOREIGN PATENT DOCUMENTS

EP          3475823  B1      4/2022

OTHER PUBLICATIONS

Waterman et al., "The RISC-V Instruction Set Manual, vol. I: Unprivileged ISA," downloaded from https://github.com/riscv/riscv-isa-manual/releases/download/Ratified-IMAFDQC/riscv-spec-20191213.pdf, Dec. 13, 2019, 238 pages.

*Primary Examiner* — Albert Decady
*Assistant Examiner* — Enamul M Kabir

(57) ABSTRACT

A checker pipeline for checking integrity of an instruction decoder of a primary processor pipeline of a processing system including an instruction fetch checker and an instruction decoder checker. The processor pipeline includes an instruction fetch stage that receives an instruction with fields and the instruction decoder stage that decodes the instruction into instruction field values. The instruction fetch checker receives and converts instruction correction information provided with the instruction into instruction byte parity information. The instruction decoder checker includes a parity converter that converts the instruction byte parity information and instruction field information into predicted field parity information used to check the integrity of the instruction decoder. The instruction correction information is ECC bits or the like which are converted into instruction byte parity bits. The parity converter combines instruction byte parity bits with corresponding instruction bits using a logic operation into the predicted field parity information.

20 Claims, 7 Drawing Sheets

(56) References Cited

U.S. PATENT DOCUMENTS

| | | | |
|---|---|---|---|
| 5,477,551 A | 12/1995 | Parks et al. | |
| 6,543,028 B1 | 4/2003 | Jamil et al. | |
| 8,095,825 B2 | 1/2012 | Hirotsu et al. | |
| 8,201,067 B2 | 6/2012 | Busaba et al. | |
| 2002/0199151 A1* | 12/2002 | Zuraski, Jr. | G06F 12/0897 |
| | | | 711/119 |
| 2005/0283685 A1 | 12/2005 | Emer et al. | |
| 2007/0180317 A1 | 8/2007 | Hirotsu et al. | |
| 2010/0131796 A1* | 5/2010 | Engelbrecht | G06F 9/3812 |
| | | | 711/119 |
| 2011/0320855 A1* | 12/2011 | Ambroladze | G06F 11/0724 |
| | | | 714/49 |
| 2014/0229807 A1* | 8/2014 | Gopal | H03M 13/09 |
| | | | 714/807 |
| 2017/0371739 A1* | 12/2017 | Plondke | G06F 12/0875 |
| 2021/0173738 A1* | 6/2021 | Vijayaraghavan | |
| | | | G06F 12/1027 |
| 2022/0164254 A1* | 5/2022 | Smittle | G06F 11/1405 |
| 2022/0215089 A1 | 7/2022 | Hershman | |
| 2023/0401313 A1* | 12/2023 | Hershman | G06F 21/554 |

* cited by examiner

TABLE 1: MAPPING OF INSTRUCTION BITS, INSTRUCTION BYTE PARITY BITS, AND INSTRUCTION FIELDS PER TYPE

| DESCRIPTION | INSTRUCTION BIT MAPPING | | | | | | |
|---|---|---|---|---|---|---|---|
| INSTRUCTION BITS | 31 30 29 28 27 26 25 | 24 23 22 21 20 | 19 18 17 16 15 | 14 13 12 | 11 10 9 8 7 | 6 5 4 3 2 1 0 | |
| INST BYTE PARITY BITS | IBP[3] | | IBP[2] | | IBP[1] | | IBP[0] |
| R-TYPE FIELDS | FUNCT7 | RS2_ID | RS1_ID | FUNCT3 | RD_ID | OPCODE | |
| I-TYPE FIELDS | IMM[11:0] | | RS1_ID | FUNCT3 | RD_ID | OPCODE | |
| S-TYPE FIELDS | IMM[11:5] | RS2_ID | RS1_ID | FUNCT3 | IMM[4:0] | OPCODE | |
| B-TYPE FIELDS | IMM[12,10:5] | RS2_ID | RS1_ID | FUNCT3 | IMM[4:1, 11] | OPCODE | |
| U-TYPE FIELDS | IMM[31:12] | | | | RD_ID | OPCODE | |
| J-TYPE FIELDS | IMM[20,10:1,11,19:12] | | | | RD_ID | OPCODE | |

*FIG. 4*

TABLE 2: PPAR CALCULATIONS BASED ON INSTRUCTION BYTE PARITY, INSTRUCTION BITS, AND INSTRUCTION TYPE

| OPTYPE | PPAR | CALCULATION |
|---|---|---|
| R, S, B | RS2_PPAR | = IBP[2] ^ INST[24] ^ INST[19] ^ INST[18] ^ INST[17] ^ INST[16] |
| R, I, S, B | RS1_PPAR | = IBP[2] ^ INST[23] ^ INST[22] ^ INST[21] ^ INST[20] ^ INST[15] |
| R, I, U, J | RD_PPAR | = IBP[1] ^ INST[15] ^ INST[14] ^ INST[13] ^ INST[12] ^ INST[7] |
| ALL | OPCODE_PPAR | = IBP[0] ^ INST[7] |
| R | IMM_PPAR | = 0 |
| I | IMM_PPAR | = IBP[3] ^ IBP[2] ^ INST[19] ^ INST[18] ^ INST[17] ^ INST[16] |
| S | IMM_PPAR | = IBP[3] ^ INST[24] ^ IBP[1] ^ INST[15] ^ INST[14] ^ INST[13] ^ INST[12] ^ INST[7] |
| B | IMM_PPAR | = IBP[3] ^ INST[24] ^ IBP[1] ^ INST[15] ^ INST[14] ^ INST[13] ^ INST[12] ^ INST[7] |
| U | IMM_PPAR | = IBP[3] ^ IBP[2] ^ IBP[1] ^ INST[11] ^ INST[10] ^ INST[9] ^ INST[8] |
| J | IMM_PPAR | = IBP[3] ^ IBP[2] ^ IBP[1] ^ INST[11] ^ INST[10] ^ INST[9] ^ INST[8] |

*FIG. 5*

SYSTEM AND METHOD OF CHECKING INTEGRITY OF AN INSTRUCTION DECODER OF A PROCESSING SYSTEM

BACKGROUND

Cross-Reference to Related Applications

This application claims the priority under 35 U.S.C. § 119 of Romanian Patent application no. A202300878, filed on Dec. 27, 2023, the contents of which are incorporated by reference herein.

FIELD

The present disclosure relates in general to processor data integrity, and more particularly to a system and method of checking the integrity of an instruction decoder of a processing system.

DESCRIPTION OF THE RELATED ART

System reliability and safety are major concerns for many types of electrical and electronics systems, including Systems-on-Chip ("SoCs"). For example, in the automotive industry, the complexity of applications has been ever increasing, resulting in a higher chance of failure of hardware or software. Standards and metrics for functional safety, such as ASIL-D (Automotive Safety Integrity Level D) for vehicle systems, require that the designs of electrical and electronics systems have to be robust enough that failures can be detected so that corrective actions can be taken.

Lockstep configurations, for example, have been developed to meet functional safety standards while not complicating software development. In a lockstep configuration, a pair of processors perform identical operations at about the same time providing redundancy to improve reliability and integrity and to provide a high level of detection coverage in the event of failure. An obvious drawback of a lockstep configuration is the cost as this approach requires complete duplication of the processor along with a comparison of every output signal, resulting in die size and power consumption penalties resulting in increased cost. Another issue is that random or asynchronous glitches caused by radiation or power or clock abnormalities impacting only one of the processors may be interpreted as a lockstep fault in which operation is halted, triggering complicated and time-consuming test procedures to be performed to identify the faulty device, if any.

In a processor pipeline implementation, the instruction decoder is typically a combinational logic control function in the execution pipeline. Standard error detecting code approaches like parity codes and/or residue codes cannot be directly used to validate the correct functionality of the instruction decoder. Traditional processor monitoring approaches required duplication of the instruction decoder for purposes of data integrity verification.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

FIG. 4 shows a first table TABLE 1 that maps instruction bits, instruction byte parity bits, and instruction fields per instruction type according to one embodiment.

FIG. 5 shows a second table TABLE 2 that illustrates predicted field parity (PPAR) calculations based on the instruction byte parity (IBP) bits, corresponding instruction bits, and the instruction type (as indicated by an instruction or operation (OPTYPE) value) performed by the byte to field parity converter of FIG. 3 according to one embodiment.

DETAILED DESCRIPTION

Complete replication of the instruction decoder of a primary processor pipeline for purposes of verification and integrity checking is avoided. Instead, error correcting code information received during the instruction memory bus transaction to fetch the instructions is used to check the integrity of the instruction decoder, all part of implementing a fault-tolerant processor core. In a Functional Safety (FuSa) compliant system-on-a-chip (SoC), the memory bus transactions used to fetch the instructions are protected by some additional information such as byte parity bits or error-correcting code bits (ECC, typically a single-error correct/double-error detect (SEC/DED ECC)). This additional information received during the bus transaction to fetch instructions is used to validate the instruction decoder function. The received instruction correction information is converted to instruction byte parity information, which is further converted to predicted field parity information that may be used to check integrity of each of the field values contained within the instruction.

Figure 1:
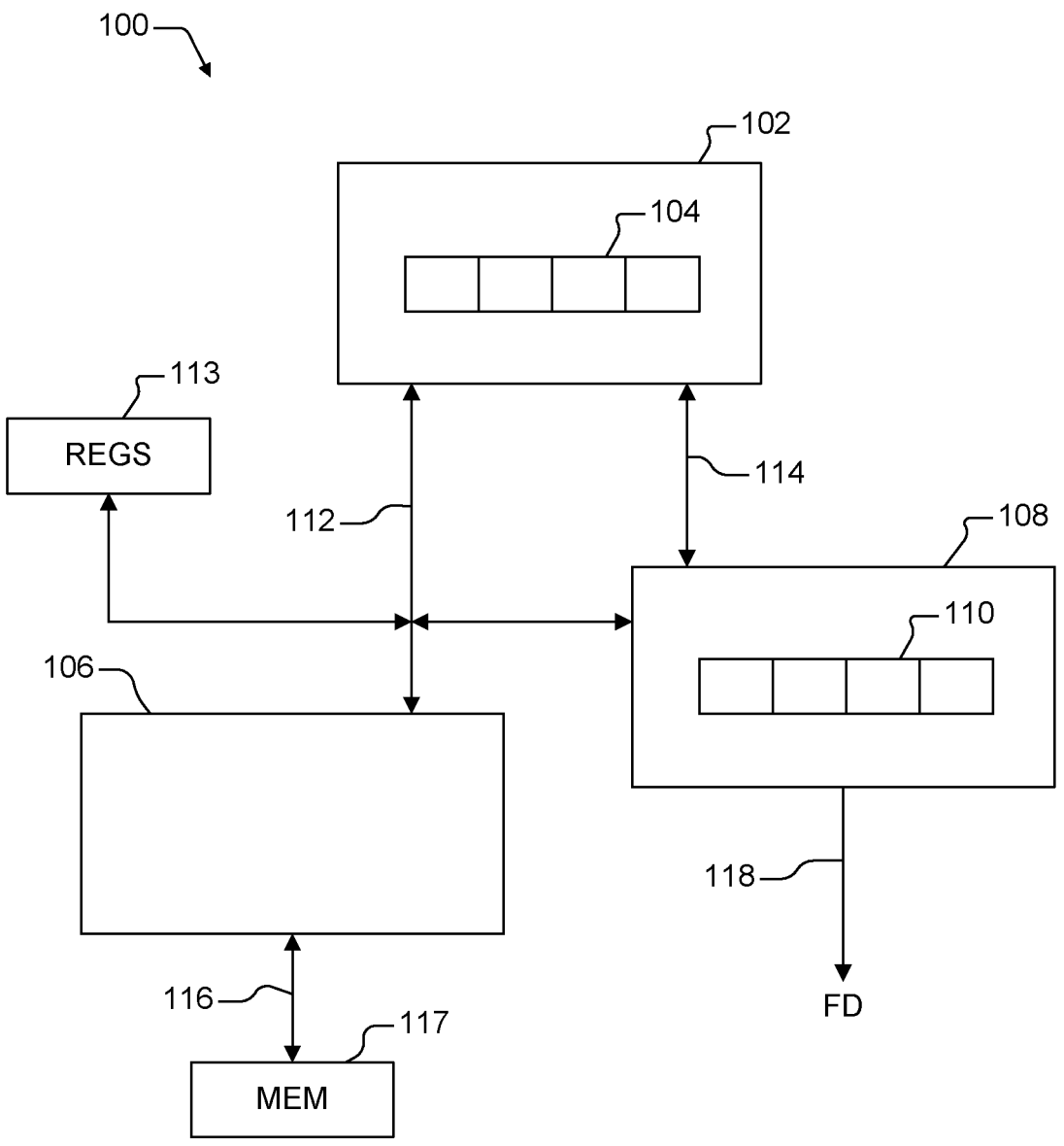
FIG. 1 is a simplified block diagram of one example of a self-checking processing system implemented according to one embodiment.

FIG. 1 is a simplified block diagram of one example of a self-checking processing system 100 implemented according to one embodiment. The self-checking processing system 100 includes a primary central processing unit (CPU) 102 that performs execution of instructions relating to the primary functionality of the processing system 100. The primary CPU 102 has a primary processor pipeline 104 with multiple stages. For example, the primary processor pipeline 104 may be a four-stage pipelined CPU with four stages. It should be understood that the set of multiple stages repeats in successive cycles during the operation of the processing system 100. The processing system 100 also includes a bus interface unit 106 and a core monitor 108. The core monitor 108 has a checker pipeline 110 that essentially operates in parallel with the primary processor pipeline 104 and may have the same number of stages as the primary processor pipeline. The checker pipeline 110 is not a duplicate of the primary processor pipeline 104. Instead, the checker pipeline 110 operates on check function data only, such as byte parity or residue codes or the like, in order to check the integrity of the operations of the primary processor pipeline 104.

The core monitor 108 operates during each of the stages of the primary processor pipeline 104. An internal bus 112 enables communication between the primary CPU 102 and the bus interface unit 106 and between the core monitor 108 and the bus interface unit 106. A set of data registers 113 may be accessed via the internal bus 112. Internal CPU signals and controls 114 may be provided between the primary CPU 102 and the core monitor 108. The bus interface unit 106 enables access to other devices and systems via a system bus interface 116, such as a memory system 117. The core monitor 108 generates and outputs a fault detection (FD) signal 118 when a fault is detected by the core monitor 108.

The core monitor 108 is not a complete duplicate of the primary CPU 102, and the checker pipeline 110 is not a complete duplicate of the primary processor pipeline 104, although operation of the core monitor 108 generally mirrors operation of the primary processor pipeline 104. The core monitor 108 may perform checking functions during each stage of the primary processor pipeline 104. The core monitor 108 implements checking functions that are used to monitor and verify the executions of the primary CPU 102, and to detect whether there is a fault in the executions performed by the primary CPU 102. The type of each checking function may be dynamically selected by the core monitor 108 based on the corresponding type of operation being performed by the primary CPU 102. One of the checking functions that may be performed by the core monitor 108 is a residue check for a CPU arithmetic instruction execution. Another checking function that many be performed by the core monitor 108 is parity checking for data transfers and logical operations. Parity checking may be byte parity checking, such as odd byte parity checking or even byte parity checking. The checking functions may include a hybrid checking approach that includes performing parity checking for data transfers and logical operations, and residue checking for the CPU arithmetic instruction execution logic. It is noted that parity checking generally provides protection against at least one bit error whereas residue checking provides protection of more complex arithmetic operations.

The figures provided herein illustrate functional blocks of CPU systems. It should be understood that a functional block may be implemented using hardware, software, or a combination of hardware and software. Generally, CPU systems of the present technology include at least one processor, and at least one memory device coupled at least indirectly to the at least one processor. CPU systems of the present technology may include multiple processors and multiple memory devices, where each memory device is coupled at least indirectly to at least one of the multiple processors. Each memory device may be any suitable type of memory device, including for example, volatile or non-volatile memory. The memory devices in the CPU system may include at least one memory storage device that stores computer readable instructions that, when implemented by at least one processor, cause the at least one processor to perform functions in accordance with the methods of the present disclosure.

Figure 2:
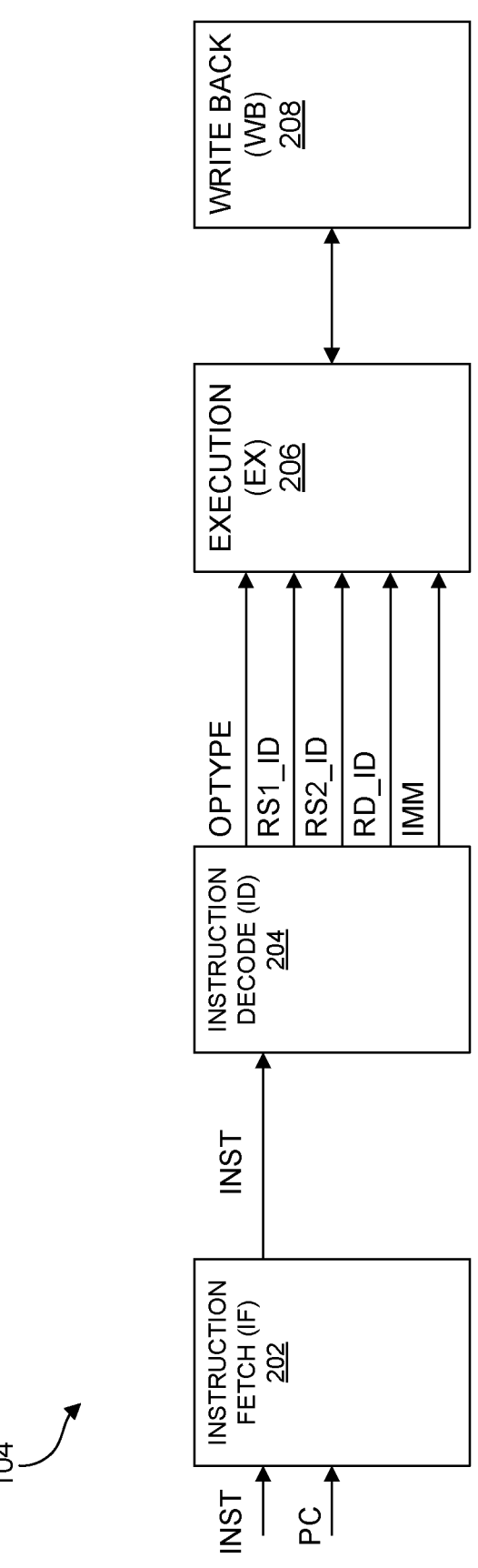
FIG. 2 is a simplified block diagram of the primary processor pipeline of FIG. 1 implemented according to one embodiment.

FIG. 2 is a simplified block diagram of the primary processor pipeline 104 implemented according to one embodiment. In one embodiment, the primary processor pipeline 104 may be implemented as a four stage RISC-V processor pipeline, although alternative processor configurations and architectures are contemplated. The primary processor pipeline 104 includes an instruction fetch (IF) stage 202, an instruction decode (ID) stage 204, an execution (EX) stage 206, and a register write-back (WB) stage 208. The IF stage 202 receives a program counter (PC) address and generally operates to fetch instructions (INST) from memory and to pass fetched instructions to the ID stage 204. The ID stage 204 generally operates to extract information and values from the instruction and to pass extracted information to the EX stage 206. For example, the ID stage 204 extracts an OPCODE from the instruction along with any other functional information that may be included (e.g., FUNCT3, FUNCT7) to form an instruction or operation type (OPTYPE) value (e.g., including the OPCODE concatenated with functional values), in which OPYTPE includes control signals indicating the operations or functions to be performed or executed. The ID stage 204 also extracts any register identifiers from the instruction that may be included, such as source register identifiers RS1_ID and RS2_ID and a destination register identifier RD_ID. The ID stage 204 may also extract an immediate value IMM, if present. The EX stage 206 executes the instruction in accordance with OPTYPE which may include using any immediate value, accessing register values from source registers using the RS1_ID and RS2_ID identifiers, writing a register value to a destination register using the RD_ID identifier, transferring information to/from memory, etc. The register WB stage 208 performs memory load and register write-back functions that are not further described.

Figure 3:
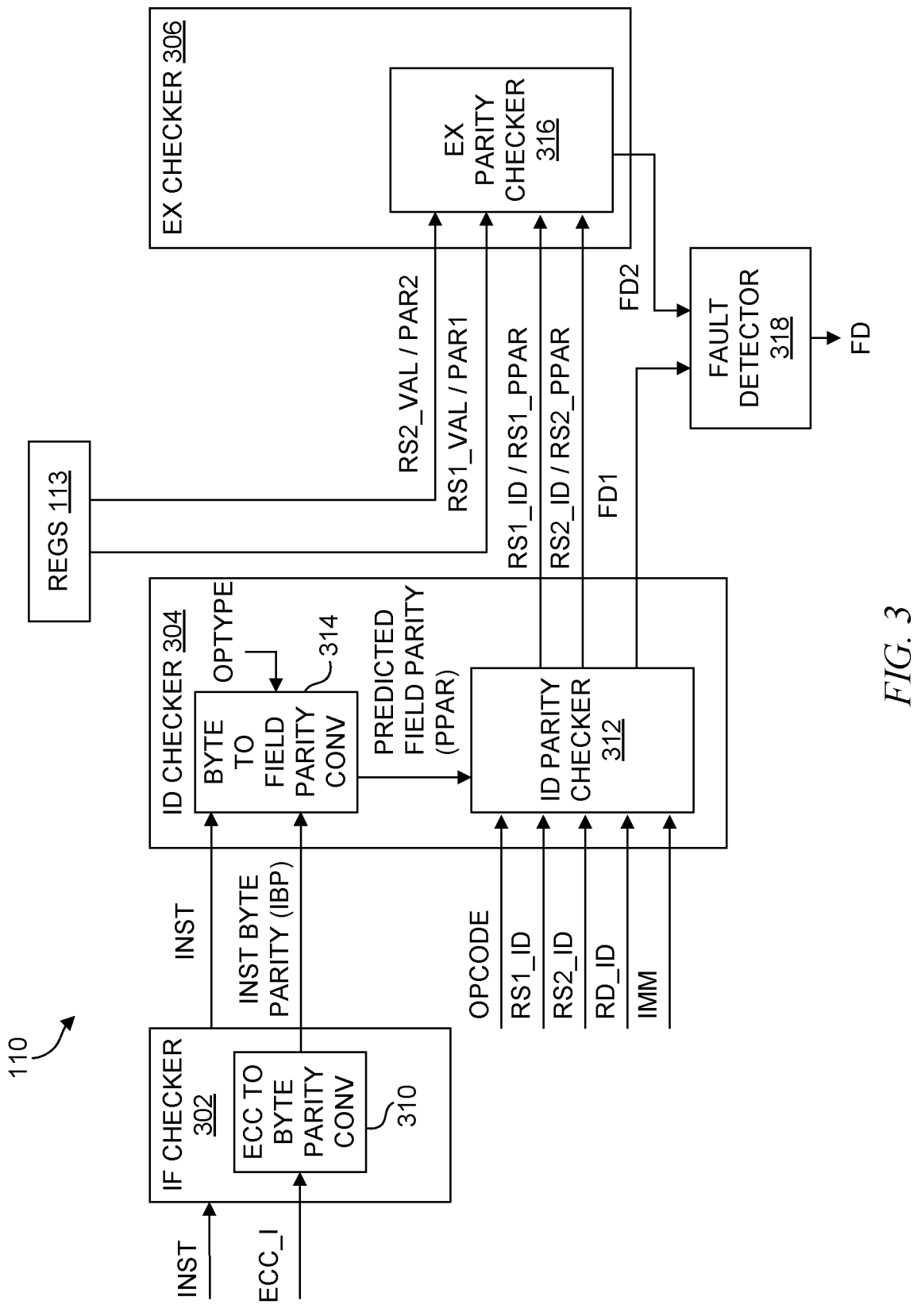
FIG. 3 is a simplified block diagram of a portion of the checker pipeline of FIG. 1 implemented according to one embodiment.

FIG. 3 is a simplified block diagram of a portion of the checker pipeline 110 implemented according to one embodiment. The checker pipeline 110 includes an IF checker 302 for checking and verifying operation of the IF stage 202, an ID checker 304 for checking and verifying operation of the ID stage 204, and an EX checker 306 for checking and verifying operation of the EX stage 206. Although not shown, the checker pipeline 110 may also include a WB checker for checking and verifying operation of the register WB stage 208. The instructions INST received by the IF stage 202 are also provided to the IF checker 302, along with error correction information. The error correction information may be in the form of error-correcting code (ECC) bits ECC_I, which may typically be configured as single-error correct/double-error detect (SEC/DED ECC) bits. Alternative error correction information may be used as well. The ECC information is typically used by a memory controller (not shown) of the memory system 117 and by the IF checker 302 to check the integrity of each INST received. The IF checker 302 may include an ECC to byte parity converter 310 that converts ECC_I into a set of instruction byte parity (IBP) bits, which includes one parity bit for each byte of the instruction INST. The instruction INST and the IBP bits are forwarded to the ID checker 304.

The ID checker 304 extracts one or more of the OPCODE, RS1_ID, RS2_ID, RD_ID, and IMM values from the INST, and provides included values to respective inputs of an ID parity checker 312. It is noted that OPCODE may be extracted from the INST and used along with other extracted information to generate the OPTYPE value in a similar manner previously described. Alternatively, OPTYPE value may be retrieved from the ID stage 204 of the primary processor pipeline 104. The ID checker 304 includes a byte to field parity converter 314 that converts the INST bits and the IBP bits into predicted field parity (PPAR) bits based on instruction type indicated by the OPTYPE value as further described herein. In one embodiment, the OPTYPE value distinguishes between one of six different instruction types, including a register type (R-type), an immediate type (I-type), a store type (S-type), a branch type (B-type), an unsigned immediate type (U-type), and a jump type (J-type). The PPAR bits are provided to respective inputs of the ID parity checker 312, which may validate selected instruction fields up to all of the OPCODE, RS1_ID, RS2_ID, RD_ID, and IMM values as further described herein. It is noted that at least one of the PPAR bits is provided for each provided one of the OPCODE, RS1_ID, RS2_ID, RD_ID, and IMM values.

In one embodiment, the RS1_ID and RS2_ID values, if provided, are not checked by the ID parity checker 312; instead, the ID parity checker 312 appends a PPAR bit RS1_PPAR to the RS1_ID value and appends a PPAR bit RS2_PPAR to the RS2_ID value and forwards the appended values downstream to the EX checker 306. In this embodiment, the ID parity checker 312 checks the integrity of any provided PPAR bits of the remaining values OPCODE, RD_ID, and IMM as further described herein. In the event an integrity check fails, the ID parity checker 312 asserts one or more first fault detected signals FD1 provided to a fault detector 318.

In one alternative embodiment, the ID parity checker 312 may instead use the PPAR bits to check each of the provided OPCODE, RS1_ID, RS2_ID, RD_ID, and IMM values for determining the FD1 signal. In another alternative embodiment, the ID parity checker 312 may instead simply append each PPAR value to a corresponding one of the provided OPCODE, RS1_ID, RS2_ID, RD_ID, and IMM values and forward each of the appended values downstream to the EX checker 306.

In the illustrated embodiment, the EX checker 306 includes an EX parity checker 316 that checks the validity of values passed from the ID checker 304. If the RS1_ID and corresponding parity value RS1_PPAR are received identifying a first source register, then during operation the EX checker 306 may retrieve a corresponding value RS1_VAL from the set of registers along with a corresponding parity value PAR1. If the RS2_ID and corresponding parity value RS2_PPAR are received identifying a second source register, then during operation the EX checker 306 may retrieve a corresponding value RS2_VAL from the set of registers along with a corresponding parity value PAR2. In one embodiment, the EX checker 306 uses the combined information to perform validation of the corresponding values. For example, the EX parity checker 316 may combine the RS1_ID, RS1_PPAR, RS1_VAL, and PAR1 values for checking the validity of the RS1_ID and RS1_VAL values in a single validity check calculation. Similarly, the EX parity checker 316 may combine the RS2_ID, RS2_PPAR, RS2_VAL, and PAR2 values for checking the validity of the RS2_ID and RS2_VAL values in a single validity check calculation. Providing a verification of multiple values in a combined calculation is more efficient and provides better fault coverage, thereby improving overall performance.

Generally, even when the EX parity checker 316 performs a combined verification calculation, RS1_PPAR is generally used to validate RS1_ID, and RS2_PPAR is generally used to validate RS2_ID. In an alternative embodiment, the EX parity checker 316 may check the validity of each received value independently in a similar manner as the ID parity checker 312. In the event an integrity check fails, the EX parity checker 316 asserts one or more second fault detect signals FD2 provided to the fault detector 318. The fault detector 318 asserts the FD signal upon detection of any fault indicated by assertion of any one of the FD1 and FD2 signals.

FIG. 4 shows a first table TABLE 1 that maps instruction bits, instruction byte parity bits, and instruction fields per instruction type according to one embodiment. In the illustrated embodiment, each instruction INST includes 32 bits, or INST[31:0]. The instruction byte parity or IBP bits includes a corresponding 4 bits IBP[3:0], including IBP[0] for the least significant 8-bits (INST[7:0]) of the instruction, IBP[1] for the next significant 8-bits (INST[15:8]) of the instruction, IBP[2] for the next significant 8-bits (INST[23:16]) of the instruction, and IBP[3] for the most significant 8-bits (INST[31:24]) of the instruction.

For each of the instruction types (R, I, S, B, U, J), the OPCODE is contained within the lower 7 bits of the instruction, or INST[6:0]. For the instruction types R, I, U, and J, the RD_ID value is provided in the next 5 bits of the instruction, or INST[11:7]. For the instruction types S and B, the INST[11:7] bits are used to contain various bits of the IMM value, shown as IMM[4:0] for S_type instruction and IMM[4:1,11] for the B_type instruction. For the instruction types R, I, S, and B, a 3-bit functional value FUNCT3 is provided in INST[14:12], and a 5-bit register ID RS1_ID for source register RS1 is provided in INST[19:15]. For the instruction types R, S, and B, a 5-bit register ID RS2_ID for source register RS2 is provided in INST[24:20]. For instruction type R, a 7-bit functional value FUNCT7 is provided in INST[31:25], for instruction type I, a 12-bit immediate value IMM[11:0] is provided in INST[31:20]. For instruction type S, the remaining 7 bits of the immediate value, or IMM[11:5], are provided in INST[31:25]. For instruction type B, the remaining 7 bits of the immediate value, or IMM[12,10:5], are provided in INST[31:25]. For instruction type U, immediate value bits IMM[31:12] are provided in INST[31:12], and for instruction type J, immediate value bits IMM[20, 10:1,11, 19:12] are provided in INST[31:12]. It is noted that the FUNCT3 value or the FUNCT3 and FUNCT7 values are combined with the corresponding OPCODE of the corresponding instruction to determine the corresponding OPTYPE value.

The mappings shown in TABLE 1 are applicable to a particular instruction set architecture and corresponding CPU and may vary between different embodiments. Nonetheless, in each case, overlapping IBP and instruction bits may be logically combined to convert the IBP parity bits into corresponding instruction field parity bits for each of the values contained therein as further described herein.

FIG. 5 shows a second table TABLE 2 that illustrates the PPAR calculations based on the IBP bits, corresponding instruction bits, and the instruction type (as indicated by OPTYPE) performed by the byte to field parity converter 314 according to one embodiment. An OPTYPE value of "ALL" means that the calculation applies to any of the instruction types R, I, S, B, U, and J. A caret symbol "^" between bit values denotes the Boolean logic exclusive-OR (XOR) operation. In general, for each field value, at least one overlapping instruction byte parity bit is selected and combined by XORing with instruction bits exclusive of the selected overlapping instruction byte parity bit(s) while also inclusive of the field bits and also inclusive of the exclusive of the selected overlapping instruction byte parity bit(s) while also exclusive of the bits of the field value.

As shown, for example, the PPAR value RS2_PPAR for the second source register identifier RS2_ID for the instruction types R, S, and B, is determined by the XOR combination of the indicated bits, or IBP[2]^INST[24]^INST[19] ^INST[18]^INST[17]^INST[16]. Similarly, the PPAR value RS1_PPAR for the first source register identifier RS1_ID for the instruction types R, I, S, and B, is determined by the XOR combination of the indicated bits, or IBP[2]^INST[23] ^INST[22]^INST[21]^INST[20]^INST[15]. Likewise, the PPAR value RD_PPAR for the destination register identifier RD_ID for the instruction types R, I, U, and J, is determined by the XOR combination of the indicated bits, or IBP[1] ^INST[15]^INST[14]^INST[13]^INST[12]^INST[7]. The PPAR value OPCODE_PPAR for the OPCODE value is IBP[0]^INST[7] for all of the instructions. The PPAR value IMM_PPAR for the immediate value is shown for each of the instruction types I, S, B, U, and J. Since the R-type instruction does not include an immediate value, IMM_P-PAR=0 for the R-type instruction.

As previously described, the PPAR values are calculated by the byte to field parity converter 314 using the IBP and INST bits based on the instruction type as indicated by OPTYPE and provided to the ID parity checker 312. The ID parity checker 312 determines the validity of a selected number up to all of the field values of the ID stage 204 for determining the FD1 signal.

Figure 6:
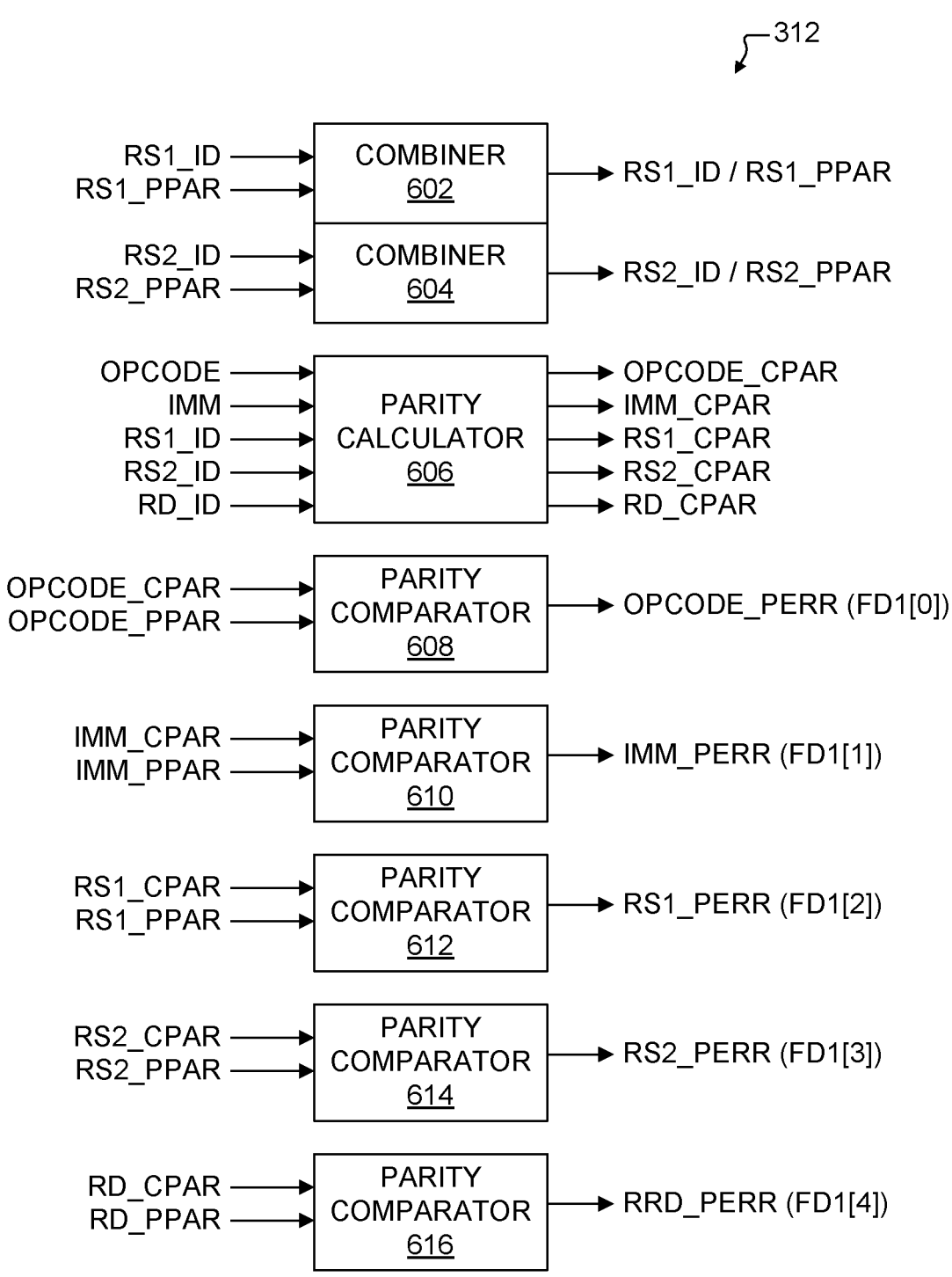
FIG. 6 is a simplified block diagram of the instruction decode (ID) parity checker of FIG. 3 implemented according to one embodiment.

FIG. 6 is a simplified block diagram of the ID parity checker 312 implemented according to one embodiment. As previously shown in FIG. 3, the ID parity checker 312 receives the OPCODE, RS1_ID, RS2_ID, RD_ID, and IMM values extracted from INST. Selected ones of the extracted values (which may include none up to all of the values) may be combined with corresponding PPAR values and passed on downstream to the EX checker 306, which includes the EX parity checker 316 that performs verification. As shown, for example, the RS1_ID value and its corresponding predicted parity value RS1_PPAR may be provided to a combiner 602, which appends these values as RS1_ID/ RS1_PPAR forwarded to the EX checker 306, and the RS2_ID value and its corresponding predicted parity value RS2_PPAR may be provided to a combiner 604, which appends these values as RS2_ID/RS2_PPAR forwarded to the EX checker 306. Any additional combiners may be included to combine other extracted values with corresponding predicted parity values in similar manner. Although the combiners 602 and 604 are shown as separate modules, a single combiner may be used to append and forward any of the values in similar manner.

Selected ones of the extracted values (including all or any remaining ones, if any) may be provided to a parity calculator 606, which determines calculated (or actual) parity values for the extracted values. As shown, OPCODE, IMM, RS1_ID, RS2_ID, and RD_ID are provided to respective inputs of the parity calculator 606, which calculates and outputs corresponding calculated parity values OPCO-DE_CPAR, IMM_CPAR, RS1_CPAR, RS2_CPAR, and RD_CPAR, respectively. Then each calculated parity is compared with the corresponding predicted parity for verification. As shown, OPCODE_CPAR and OPCODE_PPAR are provided to respective inputs of a parity comparator 608 to provide a parity error value OPCODE_PERR. IMM_CPAR and IMM_PPAR are provided to respective inputs of a parity comparator 610 to provide a parity error value IMM_PERR. Similarly, RS1_CPAR and RS1_PPAR may be provided to respective inputs of a parity comparator 612 to provide a parity error value RS1_PERR, RS2_CPAR and RS2_PPAR may be provided to respective inputs of a parity comparator 614 to provide a parity error value RS2_PERR, and RD_CPAR and RD_PPAR may be provided to respective inputs of a parity comparator 616 to provide a parity error value RD_PERR.

Although the parity comparators 608, 610, 612, 614, and 616 are shown as separate modules, a single parity comparator may be used for determining the corresponding parity error values. It is noted that FD1 may be a multiple-bit signal in which the parity error values OPCODE_PERR, IMM_PERR, RS1_PERR, RS2_PERR, and RD_PERR may be provided as respective bits of FD1[4:0]. Alternatively, FD1 may be a single bit that is asserted when any one or more of the PERR values are asserted.

Figure 7:
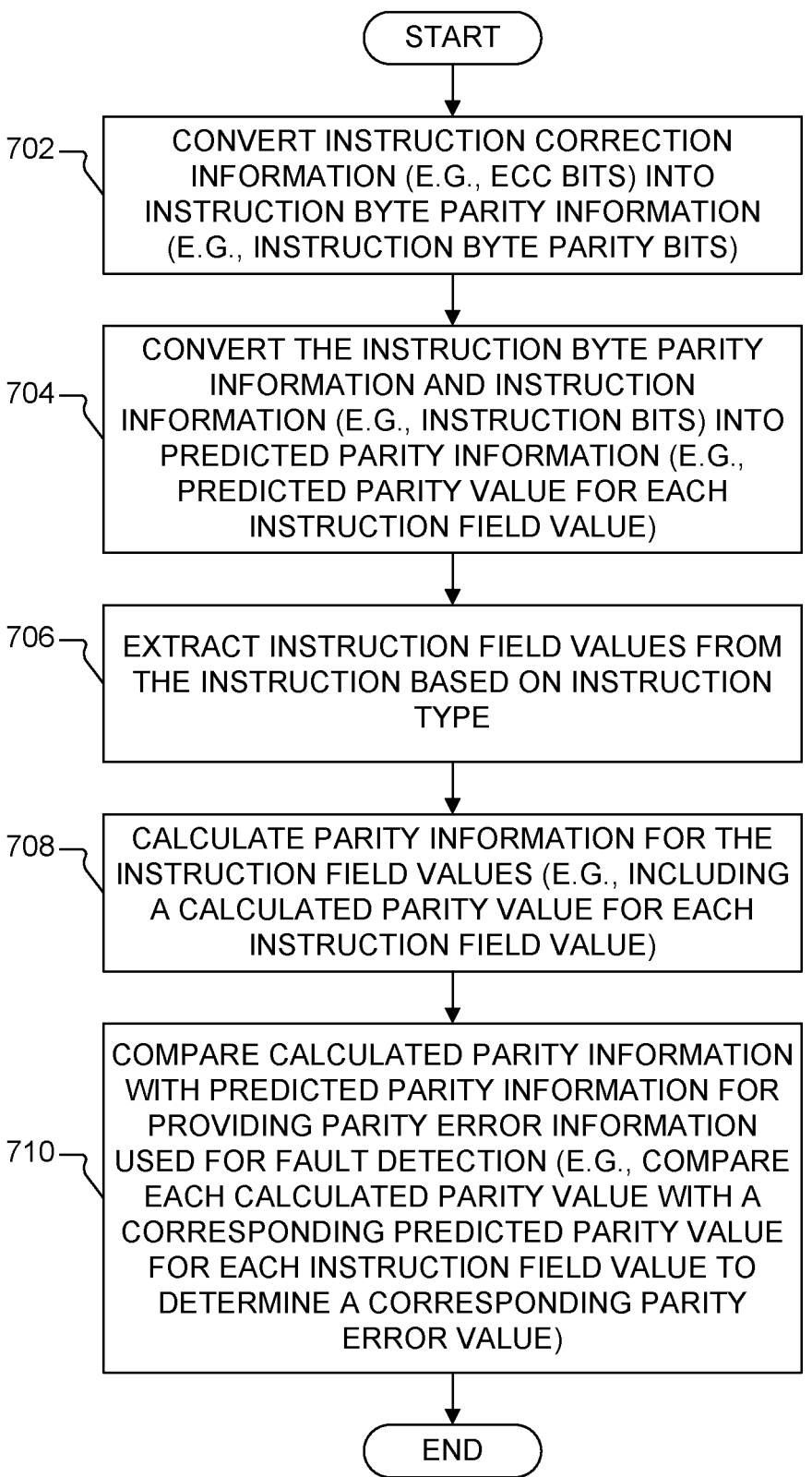
FIG. 7 is a flowchart diagram illustrating operation of the checker pipeline of FIG. 1 for verifying operation of the ID stage of the primary processor pipeline according to one embodiment.

FIG. 7 is a flowchart diagram illustration operation of the checker pipeline 110 for verifying operation of the ID stage 204 of the primary processor pipeline 104 according to one embodiment. At a first block 702, instruction correction information received while fetching the instruction, such as ECC bits or the like, is converted into instruction byte parity information (e.g., instruction byte parity bits). This function may be performed, for example, by the ECC to byte parity converter 310 provided within the IF checker 302 for verifying the received instruction INST. Operation advances to block 704 in which the instruction byte parity information and instruction information (e.g., instruction bits) are converted into predicted parity information (e.g., predicted parity value for each instruction field value). This function may be performed, for example, by the byte to field parity converter 314 of the ID checker 304 in accordance with the mapping shown by Table 1 in FIG. 4 and logic XOR calculations shown by Table 2 in FIG. 5 for determining the PPAR values for each field value.

Operation advances to block 706 in which the instruction field values are extracted from the instruction INST based on instruction type. The instruction field values may include OPCODE, RS1_ID, RS2_ID, RD_ID, and IMM depending upon the instruction type as shown in FIG. 4. Operation advances to block 708 to calculate parity information for each of the instruction field values, such as performed by the ID parity checker 312 of the ID checker 304 or the EX parity checker 316 of the EX checker 306. Each calculated parity value may be considered an actual parity value for the actual bits of the field values received from the ID stage 204. As previously described, any number (including zero) up to all of the parity calculations may be performed within the ID checker 304, such as determining the OPCODE_CPAR, RD_CPAR, and IMM_CPAR values shown in FIG. 6. Also, any number (including zero) up to all of the parity calculations may be performed within the EX checker 306, which may also perform combined parity verification determinations such as shown and described for the source register identifier values RS1_ID and RS2_ID.

Operation then advances to block 710 for comparing calculated parity information with predicted parity information for providing parity error information used for fault detection, such as comparing each calculated parity value with a corresponding predicted parity value for each instruction field value for determining a corresponding parity error value. Again, any number (including zero) up to all of the parity calculated versus predicted comparisons may be performed by the ID parity checker 312 of the ID checker 304, or any number up to all may be performed by the EX parity checker 316. Operation is then completed for the current instruction, and operation repeats for each instruction fetched from memory.

In the event that any one of the FD1 or FD2 signals are asserted during operation of the self-checking processing system 100, the fault detector 318 asserts the FD signal indicating detection of a fault. Upon assertion of the FD signal, the self-checking processing system 100 may take any suitable remedial or corrective action, not further described herein. Notification of the fault may also be provided.

It is appreciated that the ID checker 304 of the checker pipeline 110 performs validation of the ID stage 204 of the primary processor pipeline 104 without replicating the ID stage 204. Instead, error correction information received during the instruction memory bus transaction to fetch the instructions INST, such as ECC bits or the like, are converted to instruction byte parity information and then to instruction field parity information and used to validate the instruction decoder function by validating each of the values extracted by the instruction decoder of the primary processor pipeline.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A checker pipeline for checking integrity of an instruction decode stage of a primary processor pipeline of a processing system, the primary processor pipeline including an instruction fetch stage configured to receive an instruction comprising a plurality of fields and the instruction decoder stage configured to decode the instruction into a plurality of instruction field values, the checker pipeline comprising:
   an instruction fetch checker configured to receive and convert instruction correction information provided with the instruction into instruction byte parity information; and
   an instruction decoder checker comprising a parity converter configured to convert the instruction byte parity information and instruction field information into predicted field parity information that is used to check integrity of the plurality of instruction field values of the instruction decoder stage.

2. The checker pipeline of claim 1, wherein the instruction correction information comprises error correction code bits, and wherein the instruction fetch checker comprises an error correction code to byte parity converter configured to convert the error correction code bits into a plurality of instruction byte parity bits.

3. The checker pipeline of claim 1, wherein the parity converter is configured to parse the instruction into a plurality of fields based on instruction type, and for each of the plurality of fields, to combine at least one of a plurality of instruction byte parity bits with corresponding instruction bits using a Boolean logic exclusive-OR operation.

4. The checker pipeline of claim 1, wherein the parity converter is configured to parse the instruction into a plurality of fields based on instruction type, and for at least one of the plurality of fields, to combine at least one of a plurality of instruction byte parity bits with instruction bits that are exclusive of the at least one of the plurality of fields while also inclusive of the instruction bits associated with the at least one of a plurality of instruction byte parity bits and that are inclusive of the at least one of the plurality of fields while also exclusive of the instruction bits associated with the at least one of a plurality of instruction byte parity bits using a Boolean logic exclusive-OR operation.

5. The checker pipeline of claim 1, wherein the instruction decoder checker further comprises:
   a parity calculator configured to determine a calculated parity value for each of selected ones of the plurality of instruction field values; and
   a parity comparator configured to compare a predicted field parity value with a calculated parity value for each of the selected ones of the plurality of instruction field values for providing corresponding parity error values.

6. The checker pipeline of claim 5, wherein:
   the plurality of instruction field values comprises an opcode and at least one register identifier;
   wherein the parity calculator is configured to determine a calculated opcode parity value using the opcode and to determine a calculated register identifier parity value for each of the at least one register identifier; and
   wherein the parity comparator is configured to compare a predicted opcode parity value with the calculated opcode parity value and is configured to compare a predicted register identifier parity value with a calculated register identifier value for each of the at least one register identifier.

7. The checker pipeline of claim 5, wherein:
   the plurality of instruction field values comprises an immediate value;
   wherein the parity calculator is configured to determine a calculated immediate parity value using the immediate value; and
   wherein the parity comparator is configured to compare a predicted immediate parity value with the calculated immediate parity value.

8. The checker pipeline of claim 1, wherein the checker pipeline further comprises an execution checker, further comprising:
   the predicted field parity information comprising a corresponding one of a plurality of predicted field parity values for each of the plurality of instruction field values;
   wherein the instruction decoder checker comprises a combiner configured to combine and forward at least one predicted field parity value with a corresponding one of the plurality of instruction fields to the execution checker; and
   wherein the execution checker comprises a comparator checker configured to determine a calculated parity value for each received instruction field value and to compare each calculated parity value with a corresponding predicted field parity value for providing a corresponding parity error value.

9. The checker pipeline of claim 1, wherein the checker pipeline further comprises an execution checker, further comprising:

the predicted parity information comprising a predicted register identifier parity value for a register identifier value that is provided within the plurality of instruction field values;

wherein the instruction decoder checker comprises a combiner configured to combine and forward a predicted register identifier parity value with the register identifier value; and wherein the execution checker is configured to retrieve a register value and corresponding register parity value using the register identifier value, and comprises a parity checker configured to collectively verify the register value and the register identifier value using the predicted register identifier parity value and the register parity value.

10. A method of checking integrity of an instruction decode stage of a primary processor pipeline of a processing system, the primary processor pipeline including an instruction fetch stage configured to receive an instruction comprising a plurality of fields and the instruction decoder stage configured to decode the instruction into a plurality of instruction field values, the method comprising:

receiving and converting instruction correction information provided with the instruction into instruction byte parity information; and converting the instruction byte parity information and instruction field information into predicted field parity information that is used to check integrity of a plurality of instruction field values of the instruction decoder stage.

11. The method of claim 10, wherein the converting instruction correction information comprises converting error correction code bits into a plurality of instruction byte parity bits.

12. The method of claim 10, wherein the converting the instruction byte parity information and instruction field information comprises parsing the instruction into a plurality of fields based on instruction type, and for each of the plurality of fields, combining at least one of a plurality of instruction byte parity bits with corresponding instruction bits using a Boolean logic exclusive-OR operation.

13. The method of claim 10, wherein the converting the instruction byte parity information and instruction field information comprises parsing the instruction into a plurality of fields based on instruction type, and for at least one of the plurality of fields, combining at least one of a plurality of instruction byte parity bits with instruction bits that are exclusive of the at least one of the plurality of fields while also inclusive of the instruction bits associated with the at least one of a plurality of instruction byte parity bits and that are inclusive of the at least one of the plurality of fields while also exclusive of the instruction bits associated with the at least one of a plurality of instruction byte parity bits using a Boolean logic exclusive-OR operation.

14. The method of claim 10, further comprising:

determining a calculated parity value for each of selected ones of the plurality of instruction field values; and comparing a predicted field parity value with a calculated parity value for each of the selected ones of the plurality of instruction field values for providing corresponding parity error values.

15. The method of claim 14, wherein the plurality of instruction field values comprises an opcode and at least one register identifier, the method comprising:

determining a calculated opcode parity value using the opcode;

determining a calculated register identifier parity value for each of the at least one register identifier;

comparing a predicted opcode parity value with the calculated opcode parity value; and comparing a predicted register identifier parity value with a calculated register identifier value for each of the at least one register identifier.

16. The method of claim 14, wherein the plurality of instruction field values comprises an immediate value, the method comprising:

determining a calculated immediate parity value using the immediate value; and comparing a predicted immediate parity value with the calculated immediate parity value.

17. The method of claim 10, wherein the predicted parity information comprises a corresponding one of a plurality of predicted field parity values for each of the plurality of instruction field values, the method further comprising:

combining and forwarding at least one predicted field parity value with a corresponding one of the plurality of instruction fields; and determining a calculated parity value for each received instruction field value and comparing each calculated parity value with a corresponding predicted field parity value for providing a corresponding parity error value.

18. The method of claim 10, wherein the predicted parity information comprises a predicted register identifier parity value for a register identifier value that is provided within the plurality of instruction field values, the method further comprising:

combining and forwarding a predicted register identifier parity value with the register identifier value; and collectively verifying a retrieved register value and the register identifier value using the predicted register identifier parity value and a register parity value retrieved with the register value.

19. A self-checking processing system, comprising:

a primary processor pipeline, comprising:

an instruction fetch stage that is configured to receive an instruction comprising a plurality of fields; and an instruction decoder stage that is configured to decode the instruction into a plurality of instruction field values; and a core monitor having a checker pipeline that is configured to operate in parallel with the primary processor pipeline, the checker pipeline comprising:

an instruction fetch checker that is configured to receive and convert instruction correction information provided with the instruction into instruction byte parity information; and an instruction decoder checker comprising a parity converter that is configured to convert the instruction byte parity information and instruction field information into predicted field parity information that is used to check integrity of the plurality of instruction field values of the instruction decoder stage.

20. The self-checking processing system of claim 19, wherein the instruction correction information comprises error correction code bits, and wherein the instruction fetch checker comprises an error correction code to byte parity converter configured to convert the error correction code bits into a plurality of instruction byte parity bits; and wherein the parity converter is configured to parse the instruction into a plurality of fields based on instruction type, and for each of the plurality of fields, to combine at least one of a plurality of instruction byte parity bits with corresponding instruction bits using a Boolean logic exclusive-OR operation.

* * * * *